(12) United States Patent
Carpenter et al.

(10) Patent No.: US 7,099,872 B2
(45) Date of Patent: Aug. 29, 2006

(54) METHOD FOR PROVIDING ACCESS TO ONLINE EMPLOYMENT INFORMATION

(75) Inventors: Edward L. Carpenter, Euclid, OH (US); Matthew W. Carpenter, Euclid, OH (US); John Keyerleber, Richmond Heights, OH (US); Kenneth G. McComsey, Lakewood, OH (US)

(73) Assignee: Employon NJ, LLC, Euclid, OH (US)

( * ) Notice: Subject to any disclaimer, the term of this patent is extended or adjusted under 35 U.S.C. 154(b) by 304 days.

(21) Appl. No.: 10/129,416

(22) PCT Filed: Feb. 5, 2001

(86) PCT No.: PCT/US01/03741

§ 371 (c)(1),
(2), (4) Date: Nov. 5, 2002

(87) PCT Pub. No.: WO01/57712

PCT Pub. Date: Aug. 9, 2001

(65) Prior Publication Data

US 2003/0229638 A1  Dec. 11, 2003

(51) Int. Cl.
G06F 17/00 (2006.01)
(52) U.S. Cl. ............... 707/10; 707/100; 707/104.1
(58) Field of Classification Search ............... 707/10, 707/104.1, 100; 705/1, 14, 80
See application file for complete search history.

(56) References Cited

U.S. PATENT DOCUMENTS

| 5,761,497 | A | 6/1998 | Holt et al. |
|---|---|---|---|
| 5,771,378 | A | 6/1998 | Holt et al. |
| 5,832,497 | A * | 11/1998 | Taylor .................. 707/104.1 |
| 5,884,270 | A | 3/1999 | Walker et al. |
| 5,884,272 | A | 3/1999 | Walker et al. |
| 5,978,768 | A | 11/1999 | McGovern et al. |
| 6,064,977 | A | 5/2000 | Haverstock et al. |
| 6,070,143 | A | 5/2000 | Barney et al. |
| 6,126,448 | A | 10/2000 | Ho et al. |

OTHER PUBLICATIONS http://jobsearch.monster.com/.*
EMA-an Intelligent Employment Agent; Gams, M.; Intelligent Information Systems, 1997. IIS '97. Proceedings Dec. 8-10, 1997 pp. 497-502.*
A brave new e-world: technology management for corporate social responsibility; Brennan et al..; Management of Engineering and Technology, Portland International Conference on vol. 1, Jul. 29-Aug. 2, 2001 p. 14 vol. 1.*
Mecomp.net—t; Billig et al..; Parallel, Distributed and Network-Based Processing, 2003. Proceedings. Eleventh Euromicro Conference on Feb. 5-7, 2003 pp. 507-514.*

* cited by examiner

*Primary Examiner*—David Jung
(74) *Attorney, Agent, or Firm*—DLA Piper Rudnick Gray Cary US LLP

(57) ABSTRACT

The present invention provides a method of managing employment data so as to provide access to the employment data via the Internet (18). The method including the steps of determining whether a web site (22, 24) contains employment data, formatting, parsing and storing the employment data and corresponding URL into a database, automatically searching the database (16) for matching employment data, and contacting the employer representative as to the matched employment data.

25 Claims, 10 Drawing Sheets

FIG. 10

| EMPLOYMENT DATA ||
|---|---|
| JOB POSTING | RESUME |
| TITLE<br>ADDRESS<br>SALARY RANGE<br>DESCRIPTION<br>EMAIL ADDRESS | NAME<br>ADDRESS<br>OBJECTIVE/ JOB TITLE<br>SALARY RANGE<br>DESCRIPTION<br>EMAIL ADDRESS |

METHOD FOR PROVIDING ACCESS TO ONLINE EMPLOYMENT INFORMATION

FIELD OF INVENTION

The present invention relates to employment services and, in particular, to online recruiting or employment services.

BACKGROUND OF THE INVENTION

The rapid expansion of job postings on the Internet has created a large amount of employment related information, which spans hundreds of thousands of web sites. Initially, companies began posting their open job positions on their own corporate web sites. A job seeker could then readily access new employment opportunities by visiting a company's web site. As an increasing number of company web sites began to post their open jobs, however, the job search process grew proportionally. For example, a job seeker searching for a "software developer" position would have had to identify and visit the web site of every company that might have such open job positions. Thus, this growth resulted in a task that was cumbersome and time consuming for the job seeker.

In order to help address these issues, job board web sites have evolved on the Internet. The original purpose of a job board was to provide a single web site where companies could visit to post their open job positions and job seekers could visit to search for new employment opportunities. The job board concept helped the job seekers by creating a central location that a job seeker could visit to search for jobs.

Unfortunately, however, the concept increased the work and cost for companies. In addition to maintaining job postings on their own corporate web sites, companies were now required to visit the job board sites to repost, update and delete their job position information as appropriate. The accuracy of the job board information was affected when companies changed their job information, filled open position, etc., but failed to update the corresponding job board postings. These job boards also often charged a fee to the companies for this posting service. In addition, these job boards only contained job positions from companies that had actively posted jobs on the sites. In other words, companies that did not know about the job boards would have been prevented from listing the company's open positions and, consequently, eliminated opportunities for the job seekers as well as the company itself.

Most recently, the aggregation, accuracy, and freshness of job board postings have been addressed through various web spidering or crawling technologies. The technology of web site spidering or crawling consists of a process in which content from a set of source web sites is retrieved automatically. This content is typically retrieved for purpose of being indexed into a search engine web site in order to provide Internet users a central web site to use as a search tool. The type of content that is spidered is generally not filtered so the search engine web site often has indexed content from a wide variety of source web sites. New web sites that contain content to be spidered have to register with the search engine web site before their content is retrieved and indexed into the search engine. Once a new site is registered into the set of source web sites to spider, the search engine web site will periodically spider the site to search for new or updated content to index.

In these updated models, the job board periodically sends out spiders to the web sites of companies that register with the job board web site. The purpose of these spiders is to retrieve and input the latest job posting information from the company web sites and thereby automatically update the job information listed on the job board. The method, however, creates a disadvantage for companies and job seekers because the sites do not post the numerous job positions from the companies that do not register with or know of the job board web site. As such, the Internet contains a vast amount of job postings which exist only on company job boards and which are not being collected and displayed by the job board web sites.

Another new approach to job posting aggregation is the master search engine site. In this approach, the master web site collects a job seelcer's search criteria and submits it to multiple other job board web sites. The master search engine site aggregates the individual sites and presents the results to the job seeker in a single format. An advantage to this method is that the job seeker only needs to visit a single site to perform a job search. The disadvantages of this approach are that, as described above, only a subset of the job board sites on the Internet are actually searched and individual company job postings are completely omitted. Furthermore, in these types of searches, the formatting of the results can vary thereby causing the job seeker to become confused when presented with search results.

An additional feature of prior art job board web sites is the electronic notification of new job opportunities. When a new job is posted that fits within his selected category information, the job seeker automatically receives notification of the new job via email. A limitation to this system is that user may miss employment opportunities which are filtered outside of the selected category information.

Another drawback of the prior art systems relate to the search engines used for identifying a position of interest to the job seeker. The prior art systems use a table, key word or boolean driven search engine. The search engines use a pull-down menu, keyword or boolean search methodology that has a limited ability to implement intelligent searches. For instance, a job seeker may be in search of a position in a specific technical field. A search of job postings with one or two keywords may identify many unrelated jobs. It may be very time consuming for the job seeker to review every identified job posting. The effort becomes even greater when compounded by the number of such searches to be completed at each of the numerous online employment sites. The job seeker may use additional keywords to reduce the number of unrelated job postings. However, the additional keywords often have the effect of reducing certain of the job postings, which may be of interest to the job seeker, but do not necessarily contain all of the designated keywords. In other words, the search strategy may have become too restrictive. Therefore, the job seeker ends up accessing only a small fraction of jobs currently available on the Internet.

Along with the evolution of job board related web sites, the prior art systems have provided job seekers the ability to post electronically their resumes. These systems have increased the amount of resumes available online. This increase has created web sites, which collect resumes into searchable databases. These web sites often sell subscription access to their databases, which employers and recruiters purchase in order to search for qualified candidates. However, these web sites suffer from the same disadvantages and limitations as described in the job posting process: a) companies and job seekers must visit the web sites to add and update information; b) searches are limited to narrowly targeted keywords; and c) job seeker resumes are sorted into restrictive categories.

Furthermore, if these companies do not post at the job board web sites, without adequate traffic to their corporate web site and employment pages, employers cannot, on their own, reach a sufficient number of qualified candidates. As a result, the employers must choose to either pay the third party job board web sites to post a portion of their jobs online, making these opportunities accessible to a larger candidate pool, or miss many qualified candidate. Despite this investment, however, the factors listed above still limit the effectiveness of the job boards and prevent many qualified candidates from matching with the opportunities employers have paid to list.

In summary, there are deficiencies in the current state of the art in the Internet based employment process. The gap between job board listings and actual online jobs is growing rapidly. Companies develop and add recruiting pages to their own web sites much faster than the rate at which the top job boards add clients. Moreover, the gap between unique job board listings and unique jobs available online is expanding at an even faster pace, as companies that use job boards often post the same opening to between six and ten sites. Furthermore, the current web site job boards fail to aggregate completely all job postings on the Internet. Even the sites that aggregate a larger amount of the available job listings are limited by the search engine technology currently used by those job boards. In addition, the current prior art systems are deficient in their information exchange capabilities. Job board web sites rely on companies and/or job seekers to continually visit the job board web sites and update the applicable information.

SUMMARY OF THE INVENTION

The object of the present invention is a method of managing employment data to provide enhanced access via the Internet to the employment data.

A further object of the present invention is to provide a more thorough and precise searching of the employment data.

Still a further object of the present invention is to update automatically the employment data collected by the present invention.

Still yet a further object of the present invention is to format the employment data so as to allow for a more accurate and efficient search of the employment data.

Still yet a further object of the present invention is to match automatically users to fulfill employment needs.

In general, the present invention consists of several key subsystems. These subsystems are based on existing software technology, information spidering and concept based searching, which is new in its application to the Internet related employment industry.

The present invention builds on the technology of job spidering and aggregation and incorporates it into the employment field. For example, the working set of web sites which this system spiders includes the entire Internet directory ("Dot Com database"). Thus, both companies and job boards are included in the job posting collection. Furthermore, the use of spidering technology is extended to resume collection as well as spidering of job postings. This allows the creation of a much more comprehensive and complete database of the available employment data.

The present invention also applies a concept based search engine to the employment search and match problem. As noted above, prior art search engine web sites are commonly based on keyword search engine technology. In its simplest form, a keyword search takes a set of comma delimited user input words and scans its document set for one or more word or partial word matches. Keyword searches, however, have been enhanced to include word count statistics, i.e., how often a word appears in a document increases its relevancy, and boolean operators, i.e., a user can search for specific terms to return documents that must contain both words. Unfortunately, these searches remain as simple word pattern matching technology, and the casual Internet user does not necessarily possess a clear understanding of query word relevancy or boolean logic.

In order to improve the user search experience, concept based search engines were created. The premise of a concept based search engine is that it is able to "learn" thematic information regarding the documents that it indexes. This learning is typically accomplished by applying Bayesian reasoning and neural network technology to each document when it is indexed. Users are often able to search the database by using full sentence, natural language queries instead of keyword sets and boolean logic. As a concept based search engine learns its document set, it can also make distinctions and relations. This learned information allows a user to search effectively for information without knowing exactly what is being sought or how the query should be phrased.

Another important feature of a concept based search engine is that the user will always be provided with some form of results. The results from such a search engine are typically returned in descending weight order. A result with 100% weight is highly relevant to the user's query, while a result with 1% weight contains little or no relevance to the search. This behavior is a key feature of the concept based search engine, because it allows a programmatic decision to be made based on the "goodness" of a particular result.

The use of a concept based search engine in the present invention eliminates the need for the user to categorize a job posting or resume into a fixed category list and to rely on simple keyword based searches to find information, thereby providing an accurate and thorough search result. The present invention then automatically spiders job and resume related web sites for content, indexes the content into its concept based search engines, matches the content between jobs and resumes, and notifies companies and job seekers of new mutual opportunities. This process occurs continuously to maximize the timeliness and freshness of the information exchange.

Also, the present invention is able to accept a wide range of job posting formats and resume formats. The format of a job posting or resume will vary, often significantly, from web site to web site and job seeker to job seeker. By enhancing the process with newly developed software, which targets the online employment information, the system is able to index this diverse data into a common format. Once in a common format, matches within the data between job postings and resumes are efficiently performed.

BRIEF DESCRIPTION OF THE DRAWINGS

FIG. 10 provides a table depicting employment data.

DETAILED DESCRIPTION OF THE INVENTION

Figure 1:
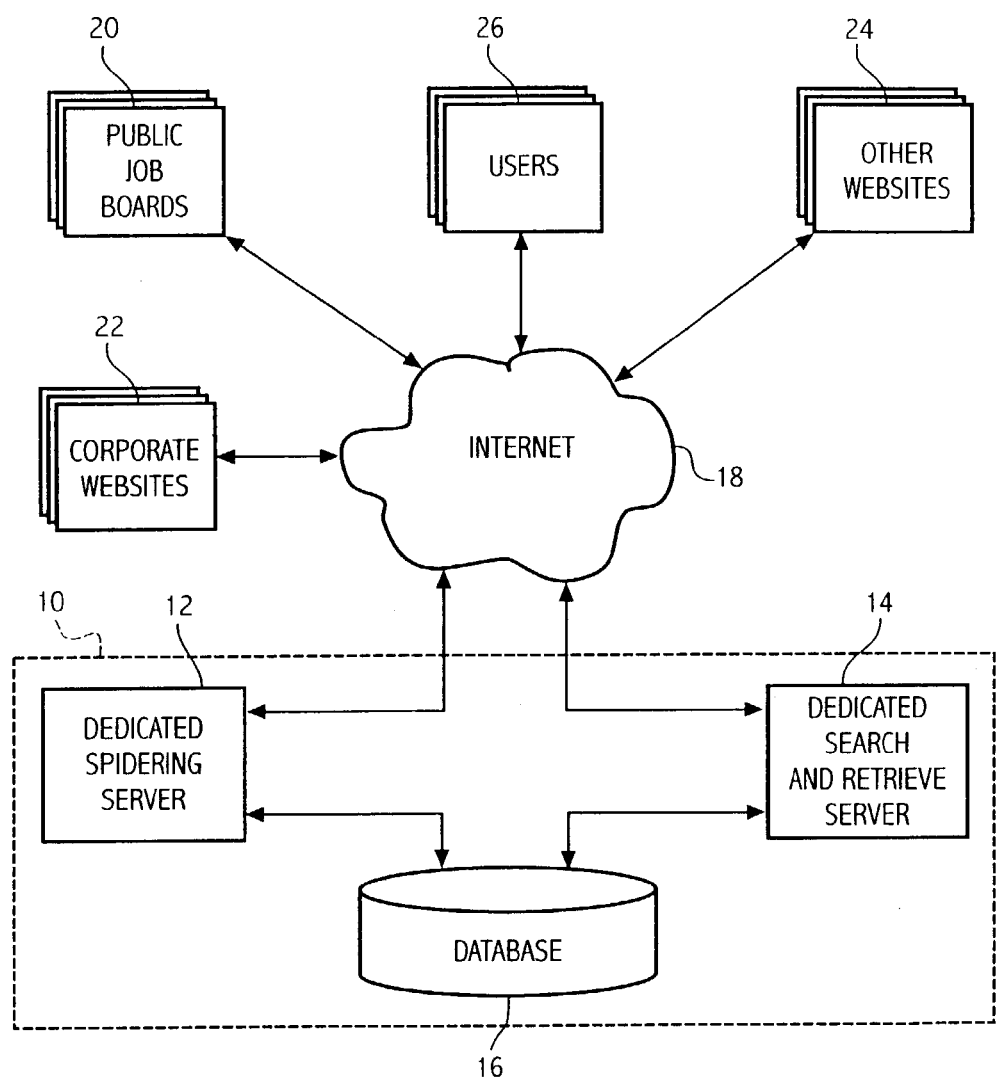
FIG. 1 is a functional block diagram of the system of the present invention.

With reference to FIG. 1, a system 10 of managing employment data is shown. The system 10 includes a dedicated spidering server 12, a dedicated search, retrieve and process server 14 and a database 16. The system 10 provides users (not shown) with the ability to search, via the Internet 18, for employment data located at public job boards 20, corporate web sites 22 and other web sites 24. Users are provided access to the system 10 via user Internet connections 26. The Internet connections 26 may be personal computers, for example.

The dedicated spidering server 12 is used to search the Internet for the employment data. FIG. 10 provides a table showing an example of employment data 28 or information available via the Internet 18. Once the employment data is located, relevant information is loaded into the database 16. The dedicated search, retrieve and process server 14 provides the user the ability to search the database 16 for employment data. Users include corporation representatives seeking to fill a position, agents working for the corporations, as well as individuals seeking an employment position. The process server 14 also conducts automatic searches of the database for matching employment data (i.e., matching jobs and resumes).

Figure 2:
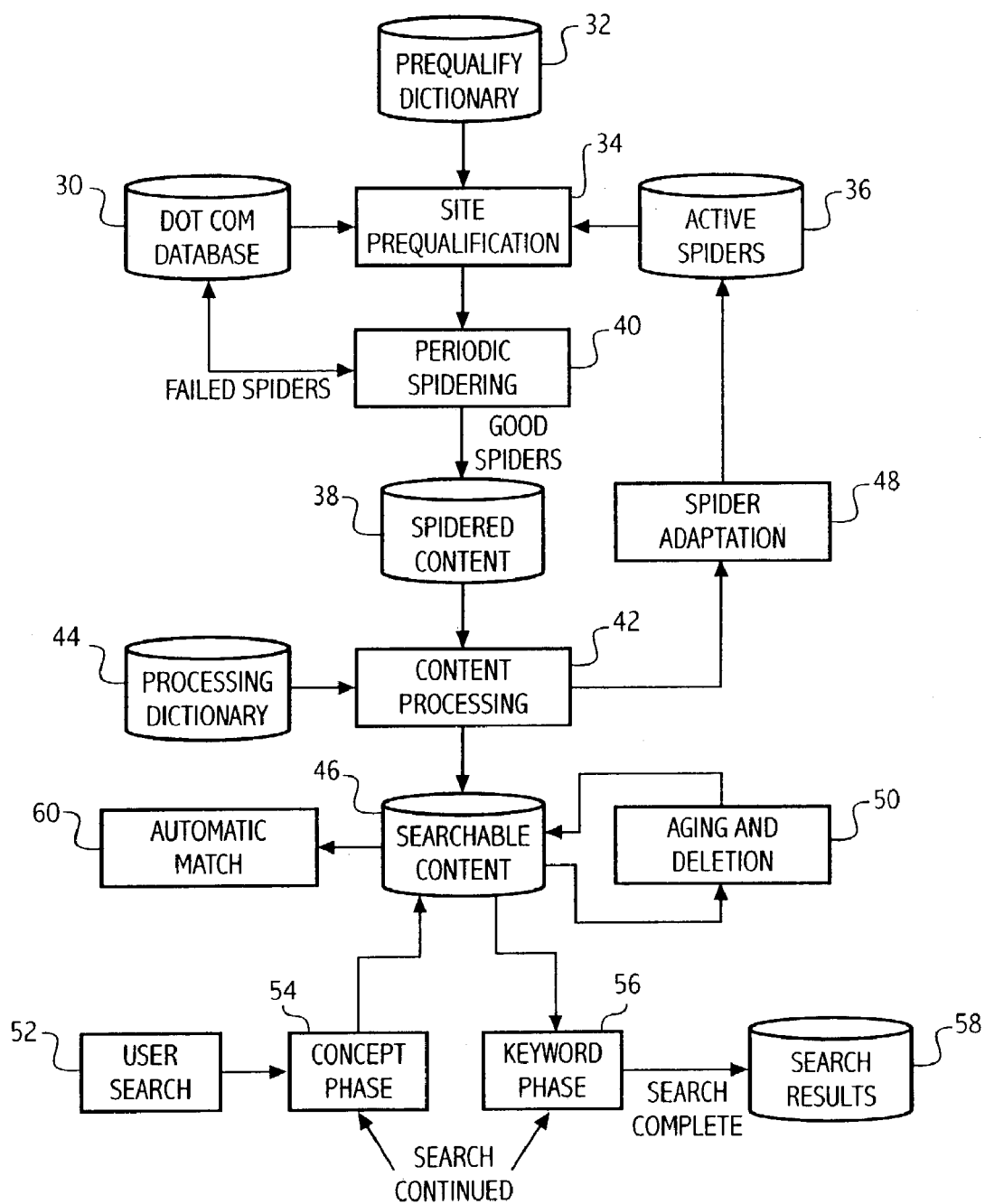
FIG. 2 shows a functional flowchart for creating and accessing a database of employment data available on the Internet.
Figure 3:
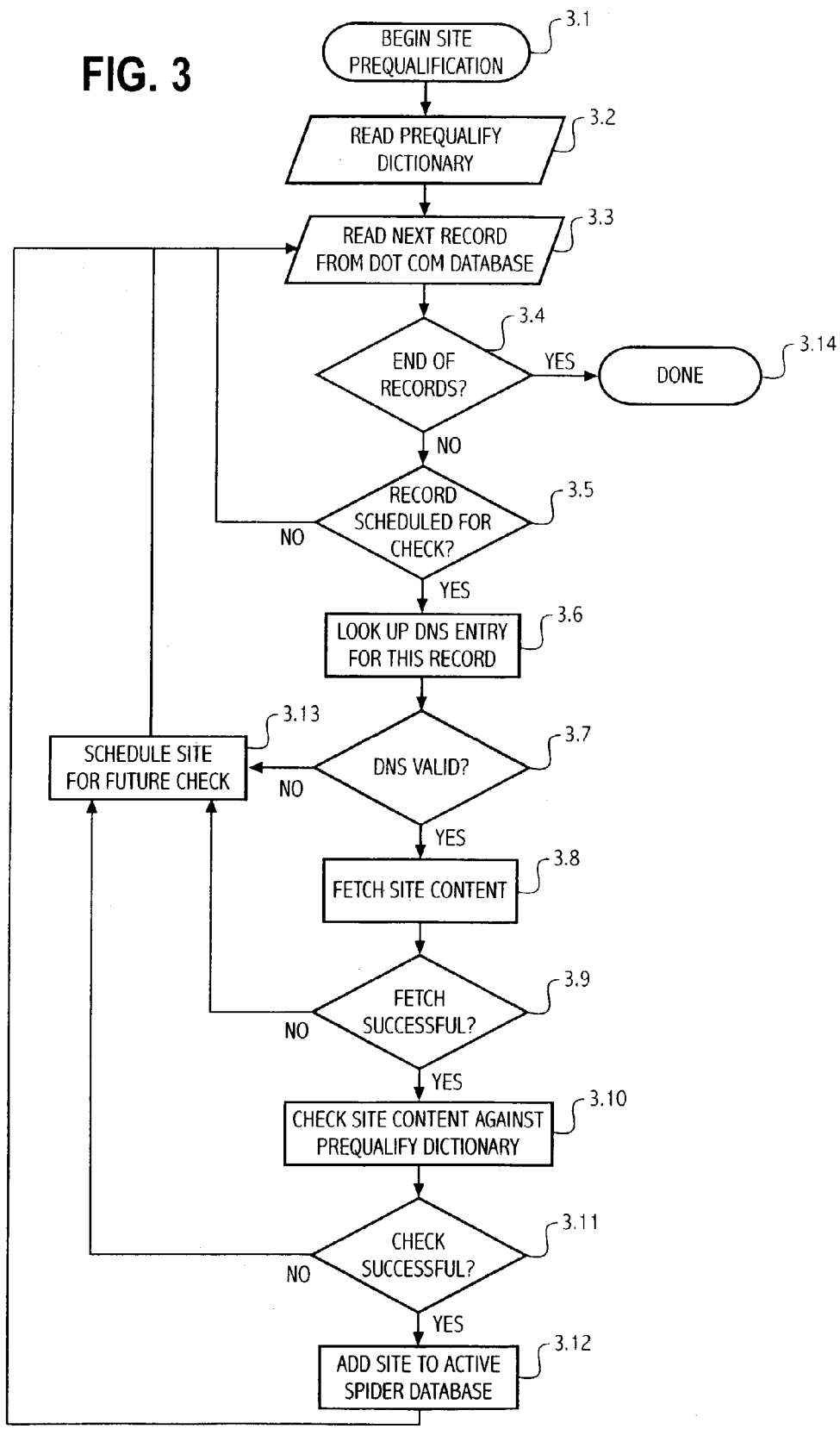
FIG. 3 shows a flow chart for determining if the visited web sites meet the employment criteria.

It will become clear from FIG. 2 that the database 16 of FIG. 1 represents multiple databases having individual functions. FIG. 2 discloses a process or functional block diagram of the present invention. In particular, FIG. 2 discloses a process which dynamically retrieves and indexes large amounts of web employment data and processes this information in an efficient and timely manner. The Dot Corn database 30 contains a listing of all the active domain names on the Internet 18. The prequalify dictionary 32 consists of a concept based search engine that has been loaded with template documents to identify web pages that contain job posting or resume information. The site prequalification step 34 receives input from the Dot Corn database 30 and the prequalify dictionary 32. The site prequalification step 34 filters web sites that contain job postings or resumes. The output of step 34 includes URL records, which are stored in the active spider's database 36. Step 34 is shown in greater detail in FIG. 3. Step 3.2 of FIG. 3 begins with reading the prequalify dictionary 32. Step 3.3 reads the next record from the Dot Corn data base 30. Step 3.5 consists of determining whether the record is scheduled for a check. At step 3.6, each record is checked against the Internet domain named service (DNS) to verify whether an active web site exists for the domain name. In the event it is determined that an active web site does not exist, then step 3.13 consists of scheduling the web site or record for a future check. In the event the web site is active, step 3.8 consists of fetching the content of the web site. Step 3.10 consists of checking the site content against the prequalify dictionary 32. The prequalify dictionary 32 contains a concept base search engine which has been configured with template sample documents of job postings and resumes. Each page of site content that is retrieved at step 3.8 is presented as a query input to the prequalify dictionary concept based search engine at step 3.10. The search engine returns a rated percent result, which indicates how relevant a particular site page is with respect to job postings or resumes. If a web site is determined to contain documents of sufficient relevancy, the site is stored in the active spider's database 36, enabling the site to be regularly spidered for its content. The retrieve content is stored in the spidered content database 38. If a web site does not exist or has no relevant content, it is scheduled at step 3.13 for a future check, at which time the site prequalification step 34 will revisit the site to repeat the foregoing process.

The site prequalification step 34 contains several key operating parameters, including the maximum number of pages to retrieve from a single web site, the amount of time to spend spidering a single web site and a threshold relevancy wait that is used to indicate whether the site contains job postings or resumes of related content. Critical to this step is the configuration of the prequalify dictionary 32, as its document set is the mechanism that controls which web sites are accepted as valid and which are rejected. The architecture of a site group prequalification step 34 is readily scalable, as in practice several services can be operating in parallel on the Dot Corn data base 30 to perform the web site validation process. By scaling services in this manner, the information scan rate of the millions of records of the Dot Corn database 30 is easily controlled.

Figure 4:
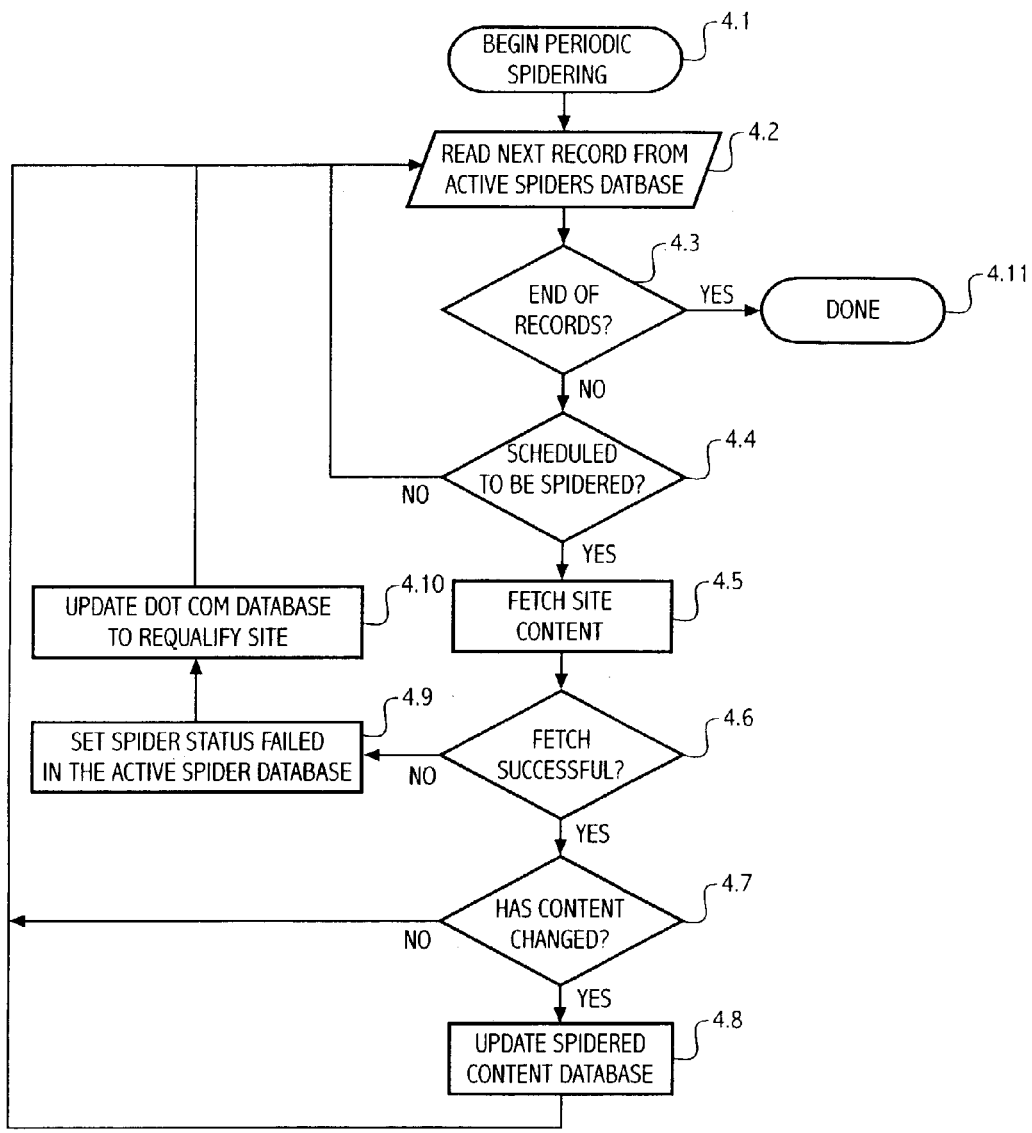
FIG. 4 shows a flow chart for updating automatically the employment data stored in the database.

The periodic spidering step 40 of FIG. 2 is responsible for running each of the spiders in the active spider's database 36 on a regular, scheduled basis. FIG. 4 discloses the periodic spidering step 40 in greater detail. Step 4.2 consists of reading the next record from the active spider's database 36. Step 4.4 determines whether the web site corresponding to the record is scheduled to be spidered. In the event the web site is scheduled to be spidered, step 4.5 fetches the site content. Step 4.7 determines whether the newly fetched content has changed from the corresponding content previously stored in the spidered content database 38 (FIG. 2) to determine whether the web site has changed. If a change has occurred, the new content is stored in the spider content database 38 for further processing.

If it is determined at step 4.6 that the spider fails when accessing a particular web site, step 4.9 consists of identifying the site as "failed" and removing the sit& from the active spider's database 36. Step 4.10 updates the Dot Corn database 30 to schedule the site to be requalified at a later time.

Step 40 is designed to run continuously to ensure that when the content of each source site changes, it is quickly updated in the spider content database 38. Thus, the timeliness and freshness of the information is preserved. Step 40 is readily scalable, as in practice several services can be operated and parallel to perform this spidering process. As additional spiders are created, additional service can be added to handle the new load.

Figure 5:
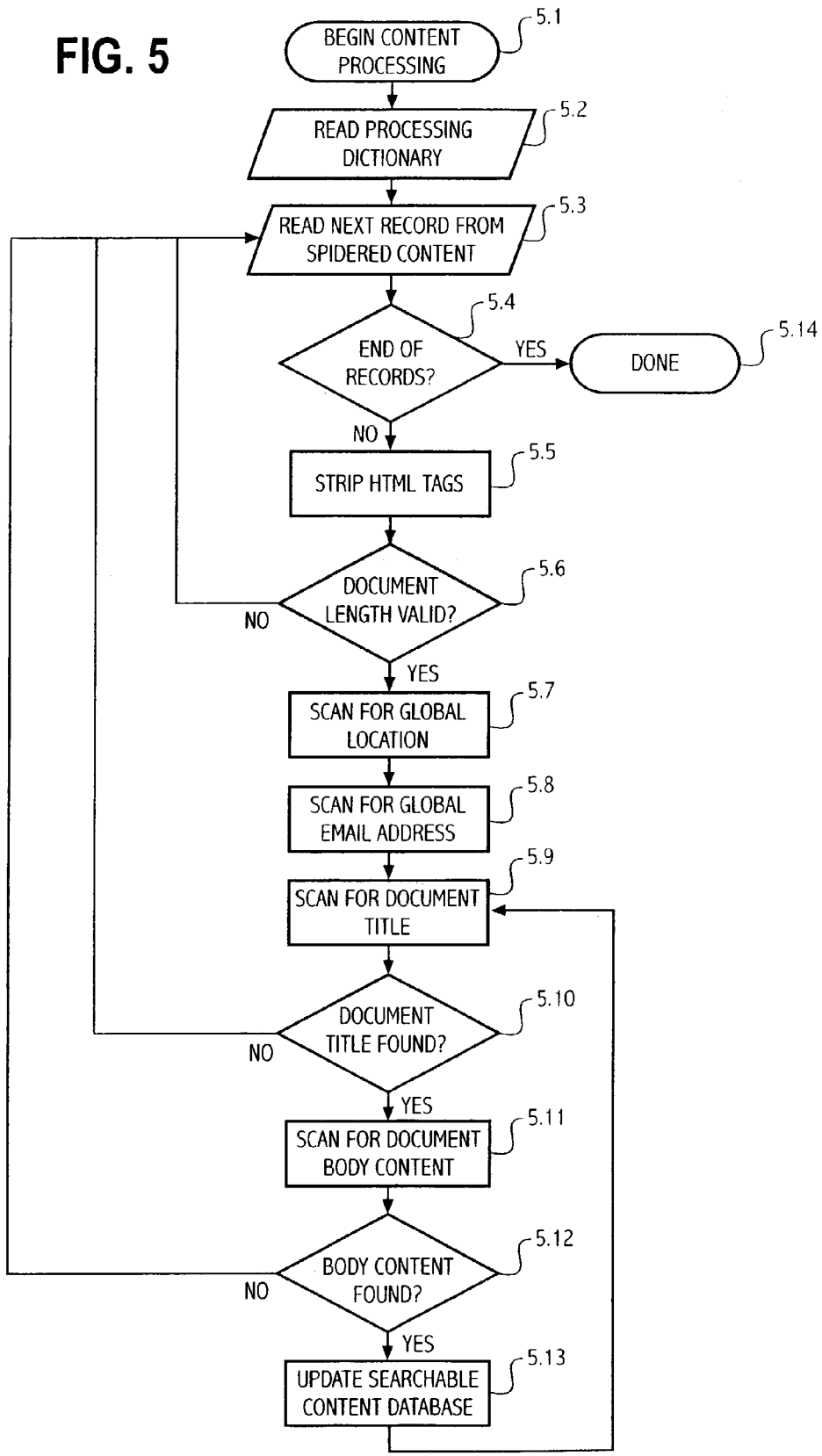
FIG. 5 shows a flow chart for formatting and parsing the employment data.

The content processing step 42 of FIG. 2 consists of further processing the content, which is temporarily stored in the spider content database 38. The processing dictionary 44 consists of a concept based search engine, which is similar to the prequalify dictionary 32. The search engine has been loaded with additional template documents that enable spidered content to be parsed and scrubbed prior to being loaded into the searchable content database 46. The content processing step 42 is shown in greater detail in FIG. 5. The content processing step 42 is responsible for processing each retrieved document into a format that is suitable for indexing into the searchable content database 36. The processing dictionary 44 contains a concept based search engine, which has been configured with documents that contain specific job titles, job descriptions and resume descriptions. The dictionary 44 is used to measure the relevance of each spidered content document to determine whether it should be classified as a job-posting, resume or irrelevant, at which time the content is discarded. Another task of step 42 is the parsing and analysis of web pages, which contain multiple sets of information. For example, a single web page, which contains 15 different job postings, is broken down into 15 separate documents utilizing available advanced document parsing technology. Each document would contain its own title and specific job location information. The improved content results in a search experience that is clear and concise to the user.

Step 5.2 consists of reading the processing dictionary 44. Step 5.3 consists of reading the next record from the spidered content data base 38. Step 5.5 strips the document of its hypertext markup language (HTML) commands. The stripped document is evaluated by step 5.6 for its length requirements, and is scanned at step 5.7 and 5.8 to identify the location information (city, state, and zip code), and the e-mail address information.

The document is then presented as query input through the processing dictionary 44. The concept based search engine is used to further identify the document as a job posting or resume as well as determine its title information and amount of different information which the document may contain (see step 5.9). Documents that do not meet minimum relevancy requirements as a job posting or resume are discarded (step 5.10 and 5.12). Documents that pass the noted criteria are indexed into the searchable content database 46 as a job posting or resume (step 5.13).

After a document passes through this process, its record in the searchable content database 46 represents a uniform entry, which is consistent with the other records. The content processing step 42 is designed to run continuously as new information is placed into the spidered content database 38. Thus, the timeliness and freshness of the information is preserved. Step 42 is readily scalable, as in practice several servers can be operating in parallel to perform the content processing. As the input spidering process information flow increases, additional servers can be added to handle the new content processing load.

Figure 6:
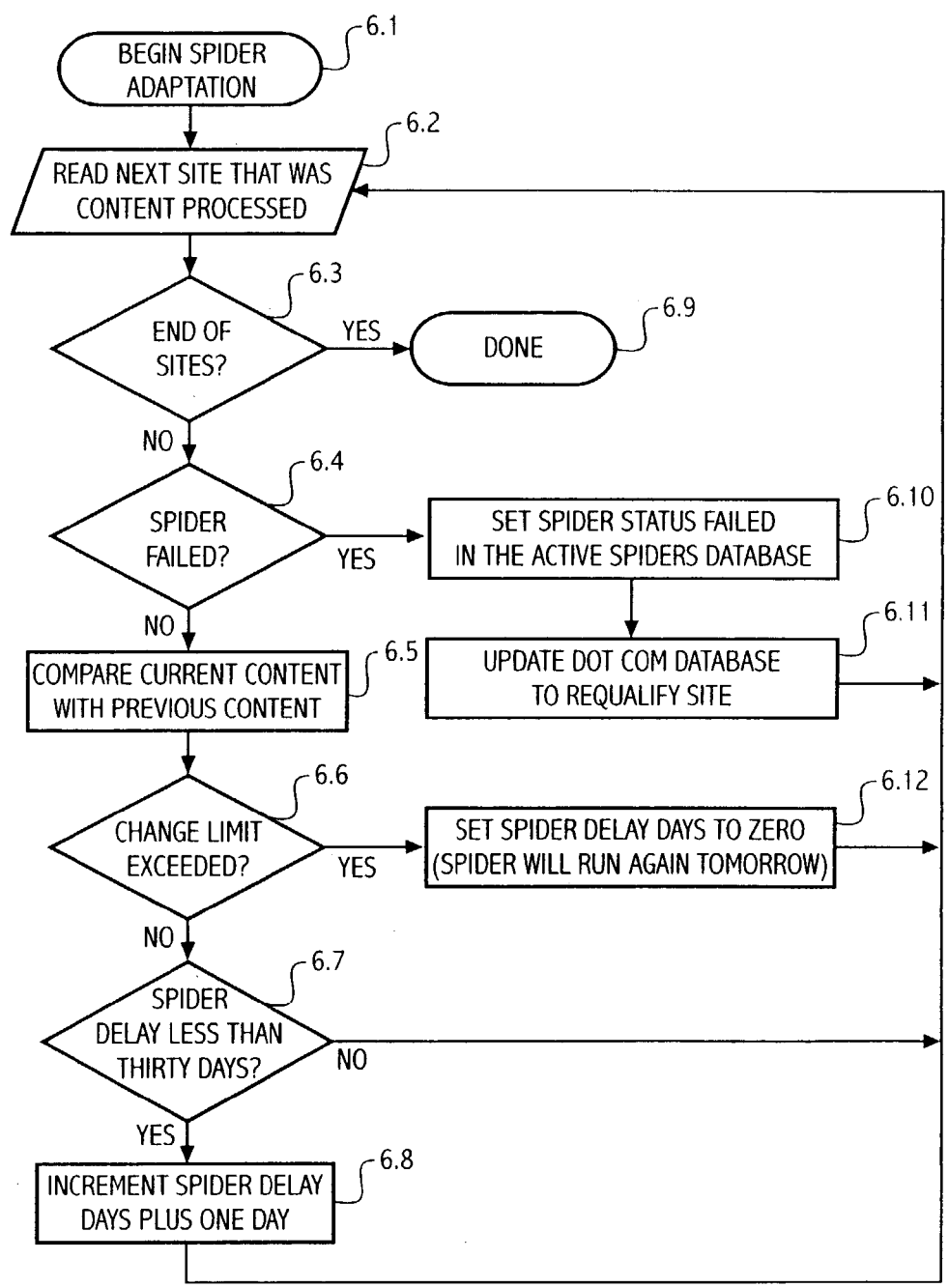
FIG. 6 shows a flow chart for adjusting the revisitation period of the visited web sites.

The spider adaptation step 48 of FIG. 2 is responsible for dynamically adjusting the operating parameters of each spider. The adaptation step 48 is shown in greater detail in FIG. 6. Step 6.2 consists of reading the next site of which the content was previously processed and stored in the searchable content database 46. In the event it is determined at step 6.4 that the particular spider failed or retrieved irrelevant content (not job posting or resume related content), then step 6.10 sets the spider status as "failed" in the active spider data base 36, and at step 6.11, the Dot Corn data base 30 is updated to requalify the failed site at a later time.

Step 6.5 compares the content retrieved at step 6.2 with the content previously stored in the searchable content database 46. Step 6.6 determines whether the changed limit has been exceeded. Based on the amount of changes that have occurred, the spider schedule will be adjusted accordingly. In the event the change limit has been exceeded, then step 6.12 will set the spider to run again the following day.

In the event the change limit has not exceeded, then step 6.7 and 6.8 will increase the spider frequency for that particular site by an additional day if the delay is presently less than 30 days. The spider adaptation step 48 is designed to run continuously as a feedback loop between the content processing step 42 and the periodic spidering step 40. Step 48 is readily scalable, as in practice several servers can be operating in parallel to perform this step 48. As the input spidering process information flow increases, additional service can be added to handle the new load.

Figure 7:
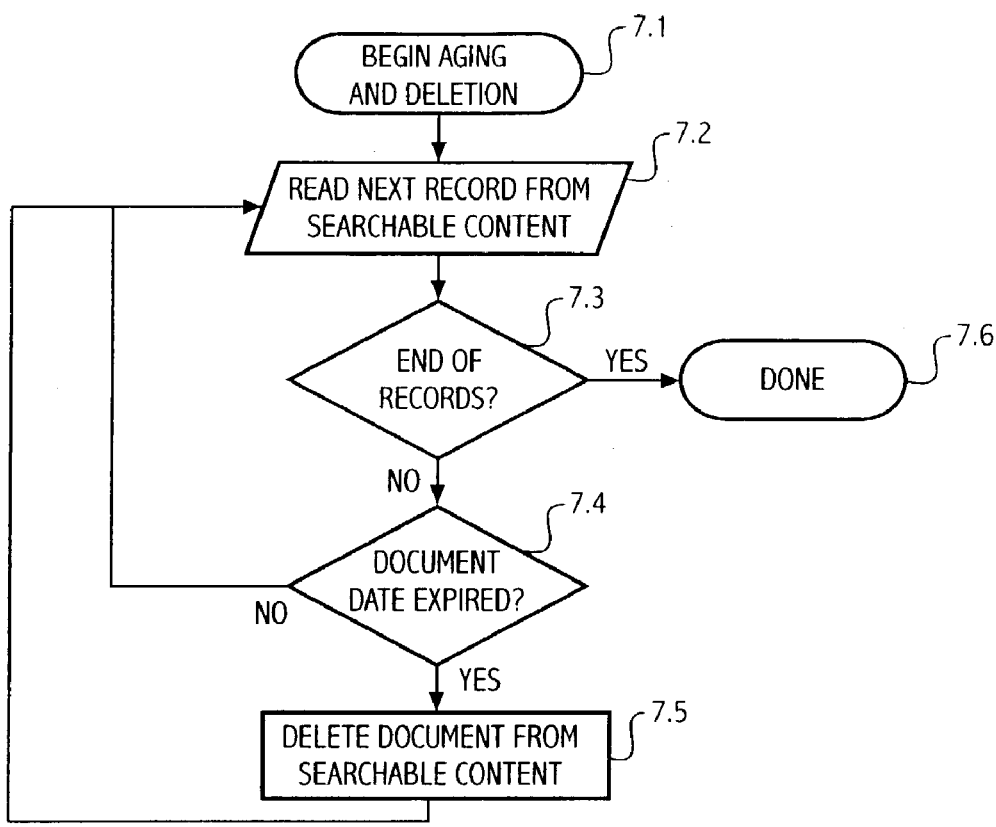
FIG. 7 shows a flowchart showing the aging and deletion step.

The aging and deletion step 50 is responsible for expiring old information in the searchable content database 46. The aging and deletion step 50 is shown in greater detail in FIG. 7. Step 7.2 reads the next record from the searchable content data base 46. Step 7.4 determines whether the document date has expired. In the event the document date has expired, step 7.5 deletes the document from the searchable content database 46. Step 50 ensures that old web sites that have been removed from the Internet are identified, and their content document sets are purged from the overall system. The aging and deletion step 50 is designed to run continuously, and it is readily scalable, as in practice several servers can be operating in parallel to perform this aging and deletion step. As the input spidering process information flow increases, additional servers can be added to handle the new load.

The result of the foregoing provides a searchable content database 46 of job positions and resumes, which may be "manually" searched by users as well as searched via an automatic process.

Figure 8:
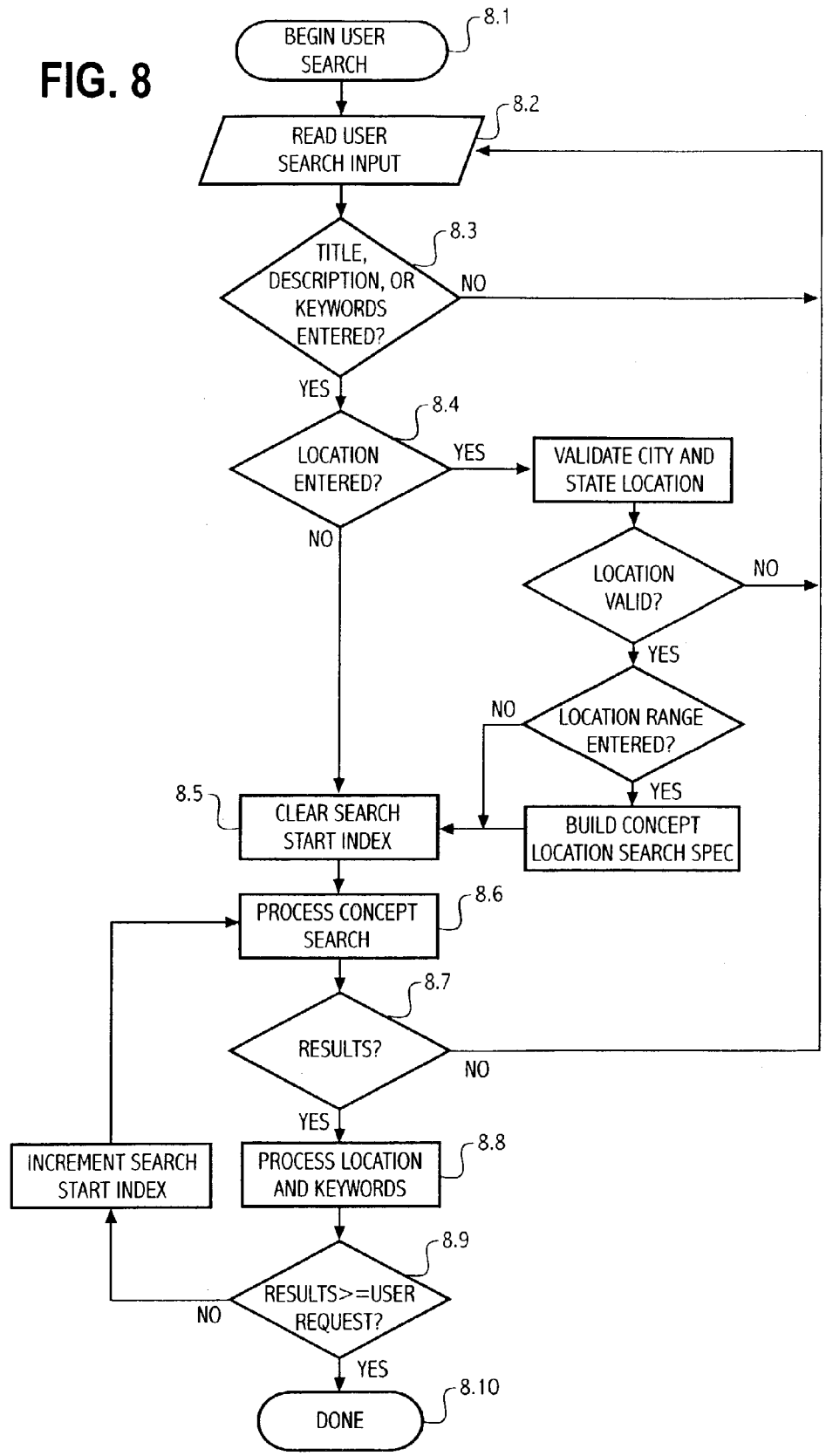
FIG. 8 shows a flow chart for collecting subscriber search criteria and conducting a concept-based search using the criteria.

The "manual" search is initiated at the user search step 52 and continues with the concept phase step 54, the keyword phase step 56 and concludes with the search results 58. FIG. 8 discloses additional details as to the user search. Step 8.2 consists of reading the user search input. Step 8.3 determines whether the title, description or key words have been entered. However, the user may further include information such as the city, state, range of location and number of results returned, etc. The concept phase step 54 occurs at step 8.6 whereupon concept searching is conducted upon the searchable content database 46 using the user input. The results are processed at step 8.8 whereupon traditional text processes and techniques are used on the result to produce a filtered result set. Step 8.9 determines whether the quantity of the results meets the users specified quantity in order to determine whether the search may be concluded.

The user search step provides a front-end, manual interface for job seekers and employers or recruiters to search for employment data, i.e., job postings or resumes, respectively. The job seeker's search is provided as a free service, whereas the resume search is sold as a subscription service.

The user search is designed to run on user demand, and is readily scalable, as in practice several servers can be operating in parallel to service multiple user search requests. As the number of new users searching the system increases, additional servers can be added to handle the new load.

Figure 9:
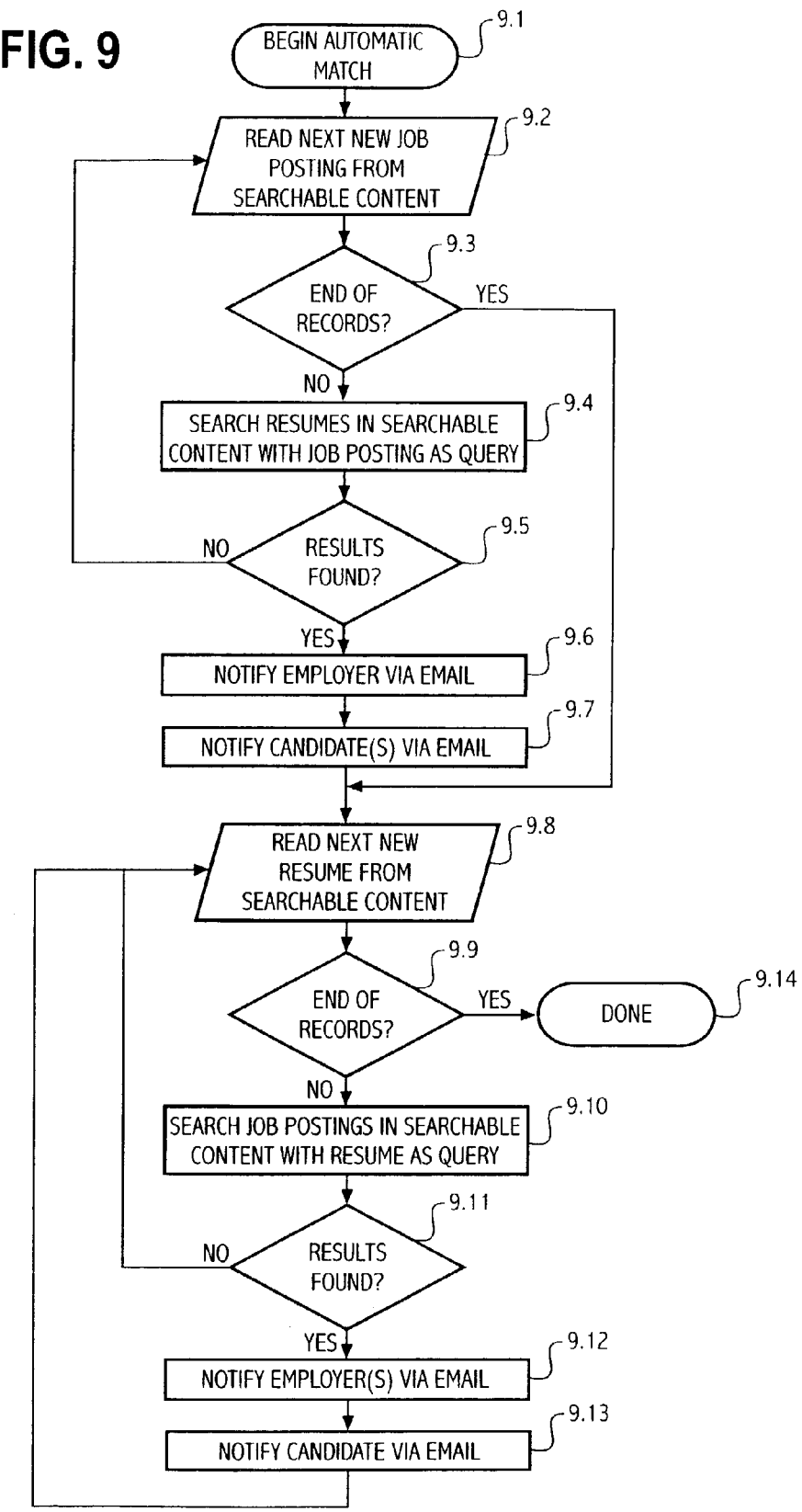
FIG. 9 shows a flowchart of matching the employment data and notifying the users.

The automatic match step 60 is responsible for identifying matches between the employer's (job postings) and job seekers (resumes). As matches are identified, both the employer and job seeker are notified via e-mail. FIG. 9 discloses the automatic match step 60 in greater detail.

Step 9.2 consists of reading the next new job posting from the searchable content database 46. Step 9.4 consists of using the contents of the new job posting as query input to perform a concept based search on the resumes in the searchable content data base 46. The results of this search consist of a set of resumes that meet a relevant percent rate with respect to the job posting content. The candidates of these resumes are identified as "good matches" for a particular job posting. At steps 9.6 and 9.7, the employer corresponding to the new job posting and the candidates corresponding to the identified resumes, are contacted via e-mail.

Step 9.8 consists of reading the next new resume from the searchable content data base 46. At step 9.10, the contents of the new resume are used as query input to perform a concept based search on the job postings in the searchable content database 46. The results of this search consist of a set of job postings that meet a relevant percent rate with respect to the resume content. The jobs are identified as "good matches" for the particular candidate. Steps 9.12 and 9.13 consist of contacting the employers corresponding to the job posting results, and the candidate corresponding to the new resume.

When a candidate receives an e-mail message containing the job description(s), the candidate is able to access the job posting details, company information, etc. free of charge. Once the candidate reviews this information, the candidate may choose to apply to a job, also free of charge. When an employer or recruiter receives the e-mail message identifying an eligible candidate(s) and the qualification summaries, the employer or recruiter may elect to purchase a web site subscription, which allows access to each candidate's resume and contact information. Furthermore, when an employer or recruiter subscribes to the web site and accesses various candidate information, the employer or recruiter may also elect to engage recruiting services to assist in pursuing the candidate.

The automatic match step 60 is designed to run continuously as new job postings and resumes are added to the searchable content database 46. The match step 60 is scalable, as in practice several servers can be operated in parallel to perform this matching and e-mail notification process. As the input information flow to the searchable content database 46 increases, additional servers can be added to handle the new load.

The invention claimed is:

1. A computer-implemented method of managing employment data so as to provide access to the employment data via the Internet, the method comprising the steps of:
    collecting employment data from information available on the Internet, wherein the step of collecting includes, via computer software, continuously visiting web sites on the Internet, and determining if the content from the visited web sites relates to employment data;
    formatting, parsing and storing the employment data into a database, via computer software, including job title, job location, job description, employer name, and corresponding employment data URL; and
    automatically updating the employment data stored in the database by revisiting the employment data websites on a continuous basis, via computer software.

2. The method of claim 1, wherein employment data includes job openings, job postings, job listings, and related employment information.

3. The method of claim 1, further comprising expanding the time between revisiting if the content has not changed.

4. A computer-implemented method of managing employment data so as to provide access to the employment data via the Internet, the method comprising the steps of:
    collecting employment data from the information available on the Internet, wherein the step of collecting includes, via computer software, continuously visiting web sites on the Internet, examining content from the visited web sites, and determining if the content from the visited web sites relates to employment data;
    formatting, parsing and storing the employment data and corresponding URL into a database, via computer software; and
    automatically updating the employment data stored in the database, via computer software.

5. A computer-implemented method of providing access to employment data via the Internet, the method comprising the steps of:
    establishing valid employment data criteria;
    randomly visiting web sites on the Internet, via computer software;
    examining content from the visited web sites, via computer software;
    determining, via computer software, if the content from the visited web sites meet the employment data criteria;
    storing, via computer software, the URL corresponding to the visited web sites that meet the employment data criteria and information relevant to the content of the visited web sites into a database;
    revisiting, via computer software, the web sites that meet the employment data criteria on a periodic basis to determine whether the content has changed; and
    providing access to employment data via the database.

6. The method of claim 5, further comprising expanding the periodic revisiting time if the content has not changed.

7. The method of claim 5, further comprising removing the URL from the data base of actively searched web sites after determining the web site no longer meets the employment data criteria.

8. The method of claim 5, wherein the step of determining if the visited web sites meet the employment criteria is done through concept searching.

9. The method of claim 8, wherein the step of concept-based searching includes using concept-based software.

10. A computer-implemented method of managing employment data so as to provide access to the employment data via the Internet, the method comprising the steps of:
    collecting employment data from the Internet, wherein the step of collecting includes, via computer software, continuously visiting web sites on the Internet, examining content from the visited web sites, and determining if the content from the visited web sites relates to employment data;
    formatting, parsing and storing the employment data into a database, via computer software; and
    providing access to employment data in a common format via the database.

11. The method of claim 10, wherein the formatting and parsing the employment data is done by using formatting software.

12. A computer-implemented method of managing employment data so as to provide access to the employment data via the Internet, the method comprising the steps of:
    determining, via computer software, whether a web site contains employment data;
    formatting, parsing and storing the employment data and corresponding URL into a database, via computer software;
    revisiting and determining whether a previously visited web site has revised employment data, and formatting parsing and storing the revised employment data and respective web site address into the database for each web site which has revised the employment data, via computer software;
    automatically searching, via computer software, the database for matching employment data; and contacting, via computer software, the employer representative as to the matched employment data.

13. The method of claim 12, wherein the step of contacting includes providing the employer representative with a portion of the matching employment data and offering all of the matching employment data upon the purchase of a subscription.

14. The method of claim 12, further comprising providing the employer representative the authority to search the database for matching employment data, providing a portion of the matching employment data and offering all of employment data upon the purchase of a subscription.

15. The method of claim 12, further comprising the steps of confirming that a previously visited web site continues to contain employment data, and removing the previously stored URL from the database of actively searched web sites in the event the revisited web site no longer contains employment related data.

16. The method of claim 12, further comprising the step of adjusting the period of revisiting based on the degree to which the employment data has been revised.

17. A computer-implemented method of providing employment data available via the Internet, the method comprising the steps of:
repetitively visiting web sites on the Internet, via computer software;
examining content from the visited web sites, via computer software;
determining, via computer software, if the content from the visited web sites relates to employment information;
parsing employment information including job title, job location, employer name, and corresponding URL, via computer software;
storing the employment information into a database, via computer software; and
providing employment information available from the database.

18. The method of claim 17, wherein the step of visiting web sites includes randomly visiting web sites on the Internet.

19. The method of claim 17, wherein the step of visiting web sites includes revisiting the web sites that relate to employment information on a periodic basis to determine whether the content has changed.

20. The method of claim 19, further comprising expanding the periodic revisiting time if the content has not changed.

21. A computer-implemented method of providing employment data available via the Internet, the method comprising the steps of:
searching, via computer software, the Internet for employment data posted on the Internet;
determining, via computer software, a web address for the employment data identified in the searching step;
maintaining, via computer software, an index database for the employment data identified in the searching step, the index database including the respective web address for the employment data identified in the searching step;
routinely revisiting, via computer software, the web address to determine if information, regarding the employment data posted at the web address, has changed, and automatically updating the index database with any changed information; and
providing employment information available from the database.

22. The method of claim 21, further comprising the steps of determining the keywords for the employment data identified in the searching step, and maintaining the index database to include the respective URL and the keywords for the employment data identified in searching step.

23. The method of claim 21, further comprising the step of: continuously searching the Internet for new information regarding employment data posted on the Internet; and updating the index database with the new information.

24. The method of claim 21, wherein the step of searching the Internet includes searching the Internet for employment data using concept searching.

25. The method of claim 24, wherein the step of concept-based searching includes using concept-based search software.

* * * * *